(12) United States Patent
Hsieh

(10) Patent No.: US 6,295,331 B1
(45) Date of Patent: Sep. 25, 2001

(54) METHODS AND APPARATUS FOR NOISE COMPENSATION IN IMAGING SYSTEMS

(75) Inventor: Jiang Hsieh, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/351,757

(22) Filed: Jul. 12, 1999

(51) Int. Cl.$^7$ .................................................. A61B 6/03
(52) U.S. Cl. .................................... 378/19; 378/4
(58) Field of Search ...................... 378/4, 7, 8, 19

(56) References Cited

U.S. PATENT DOCUMENTS

| | | |
|---|---|---|
| 5,249,123 * | 9/1993 | Hsieh ...................................... 378/19 |
| 5,359,638 | 10/1994 | Hsieh . |
| 5,907,593 * | 5/1999 | Hsieh et al. .............................. 378/4 |

* cited by examiner

*Primary Examiner*—David V. Bruce
(74) *Attorney, Agent, or Firm*—Armstrong Teasdale LLP; Christian G. Cabou

(57) ABSTRACT

A method and apparatus for image reconstruction in an imaging system having an x-ray source, an x-ray detector module having a plurality of detector channels, a data acquisition system coupled to the detector module, and a scanning axis z, in which a scan of an object is performed to obtain data, and a smoothing filter is applied to the data, wherein the smoothing applied to the data varies as a function of position. To compensate for increased noise near the edge of a field of view, for example, a z-smoothing filter applies an increased amount of smoothing to the data as a distance from an isochannel increases. A channel dependent primary speed/afterglow correction can also be used to provide smoothing.

29 Claims, 3 Drawing Sheets

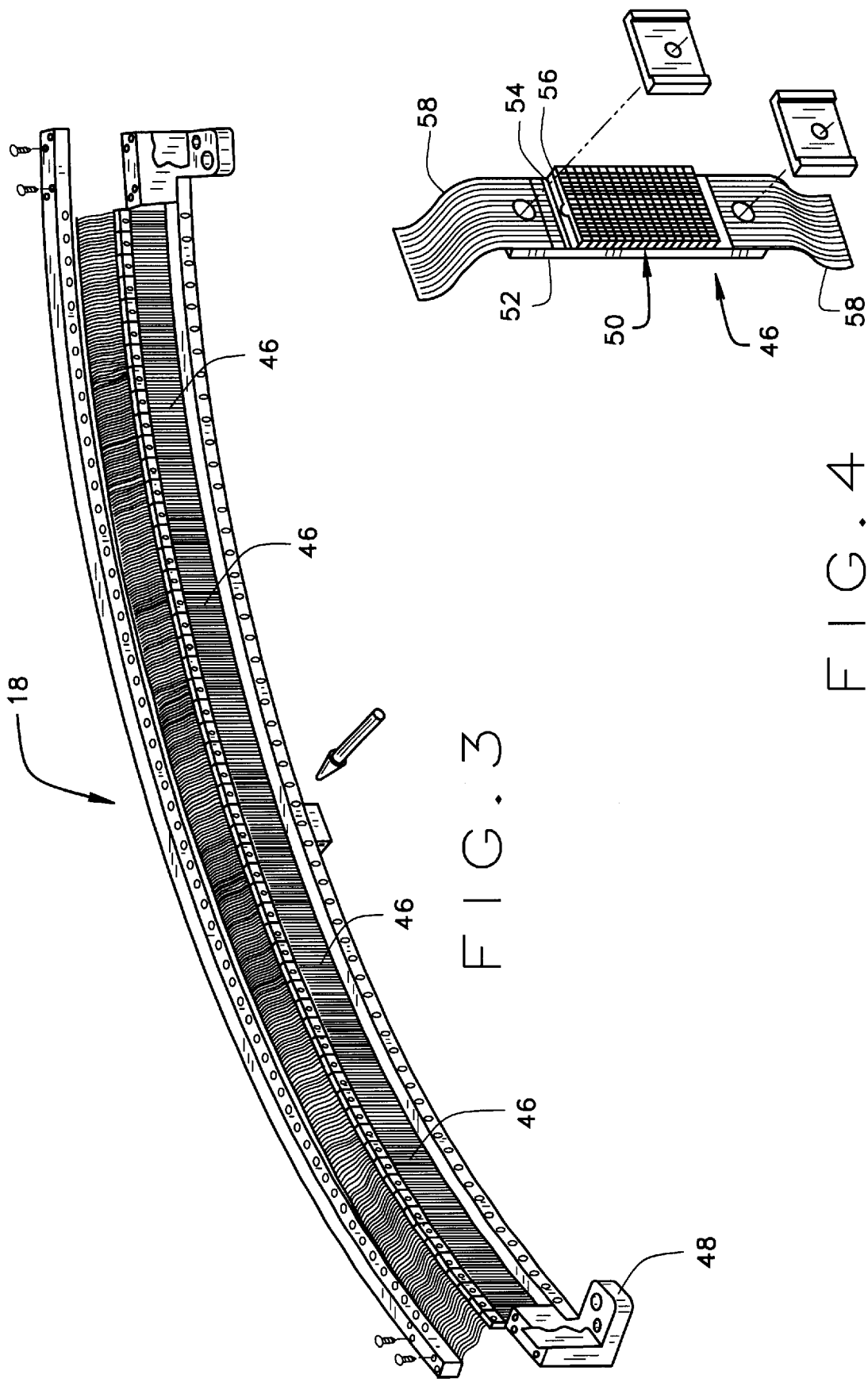

METHODS AND APPARATUS FOR NOISE COMPENSATION IN IMAGING SYSTEMS

BACKGROUND OF THE INVENTION

This invention relates generally to imaging and, more particularly, to generating images from projection data collected in a multislice imaging system. In at least one known imaging system generally referred to as a computed tomography (CT) system, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In one known third generation CT system, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a post patient collimator for collimating scattered x-ray beams received at the detector. A scintillator is located adjacent the post patient collimator, and photodiodes are positioned adjacent the scintillator.

Multislice CT systems are used to obtain data for an increased number of slices during a scan. One known multislice system includes detectors generally known as 3-D detectors. With such 3-D detectors, a plurality of detector elements form separate channels arranged in columns and rows. Each row of detectors forms a separate slice. For example, a two slice detector has two rows of detector elements, and a four slice detector has four rows of detector elements. During a multislice scan, multiple rows of detector cells are simultaneously impinged by an x-ray beam, and therefore data for several slices is obtained.

Images generated by a multi-slice scanner may, however, appear to be somewhat noisier than images produced by other known types of scanners, such as CT/i scanners, at the recommended x-ray tube current reduction factor. At least one known embodiment of a multislice scanner uses a shorter geometry which increases image noise away from the center of the image compared to other known longer geometry scanners. More particularly, and as a result of the geometry change and the fan beam reconstruction in the multislice system, to reduce the concentric force on the x-ray tube, the x-ray tube to iso-center distance needs to be reduced. Consequently, the magnification factor for such scanner increases, the scaling factor used in the fan beam backprojection increases, and the noise in the reconstructed image also increases. It would be desirable to provide that an image generated from data collected in a short geometry multislice scan has about the same image quality, e.g., noise reduction, as images generated by other types of scanners.

BRIEF SUMMARY OF THE INVENTION

In one embodiment, the present invention is a method and apparatus for image reconstruction in an imaging system having an x-ray source, an x-ray detector module having a plurality of detector channels, a data acquisition system coupled to the detector module, and a scanning axis z, in which a scan of an object is performed to obtain data, and a smoothing filter is applied to the data to effect a position—dependent reduction in noise. For example, to compensate for increased noise near the edge of a field of view, a z-smoothing filter applies an increased amount of smoothing to the data as a distance from an isochannel increases.

Such methods and apparatus provide images generated from data collected in a multi-slice scan that have essentially the same image quality, e.g., noise reduction, as images generated by other types of scanners.

BRIEF DESCRIPTION OF THE DRAWINGS

FIG. 3 is a perspective view of a CT system detector array.

FIG. 4 is a perspective view of a detector module.

DETAILED DESCRIPTION OF THE INVENTION

Set forth below is a description of an exemplary multislice CT system in accordance with one embodiment of the present invention. Although one embodiment of the system is described in detail below, it should be understood that many alternative embodiments of the inventions are possible. For example, although one particular detector is described, the present invention could be utilized in connection with other detectors, and the present invention is not limited to practice with any one particular type of multislice or single slice detector. Specifically, the detector described below includes a plurality of modules and each module includes a plurality of detector cells. Rather than the specific detector described below, a detector which has multiple modules with multiple elements along the x-axis and/or z-axis joined together in either direction to acquire multi-slice scan data simultaneously, can be utilized. Generally, the system is operable in a multislice mode to collect 1 or more slices of data. Axial and helical scans can be performed with the system, and cross section images of a scanned object can be processed, reconstructed, displayed and/or archived.

Figure 1:
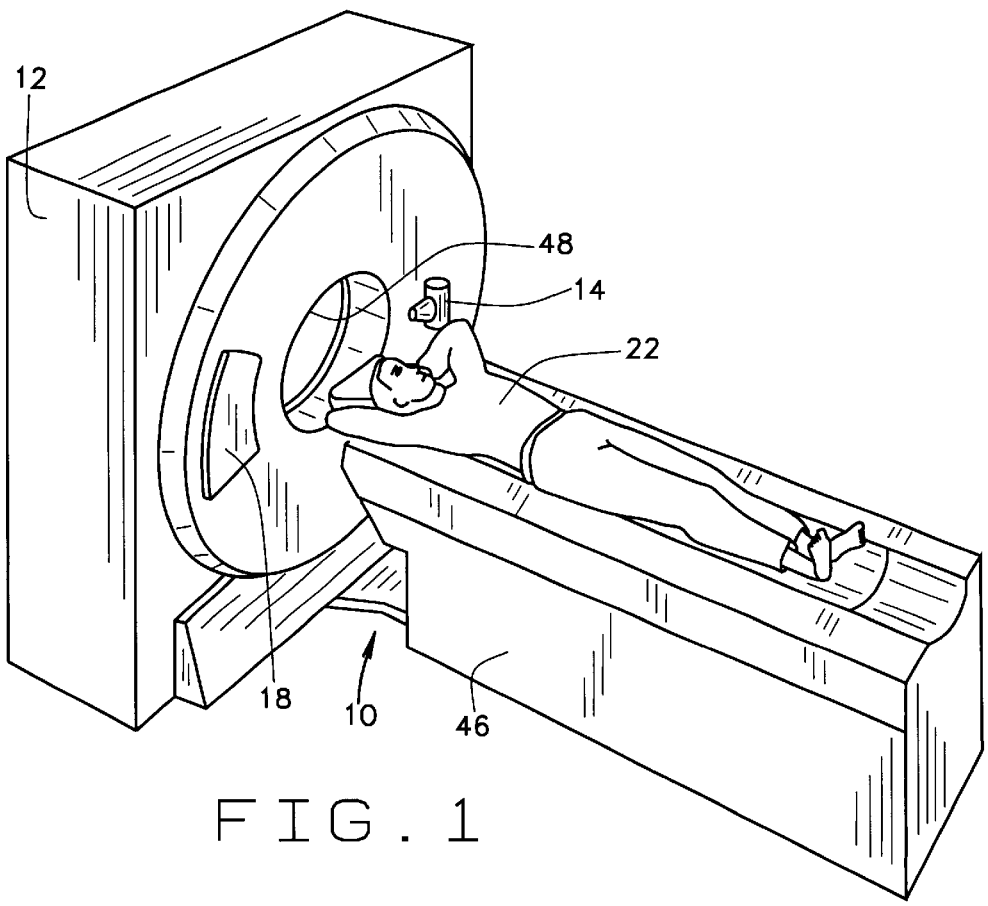
FIG. 1 is a pictorial view of a CT imaging system.
Figure 2:
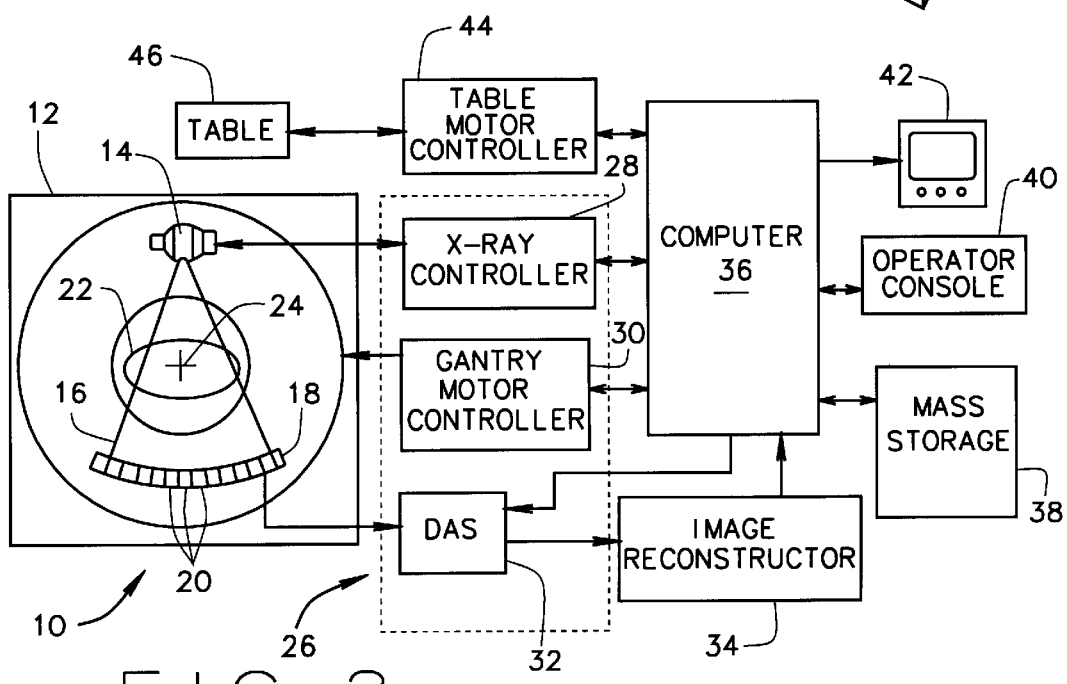
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives and supplies signals via a user interface, or graphical user interface (GUI). Specifically, computer receives commands and scanning parameters from an operator via console 40 that has a keyboard and a mouse (not shown). An associated cathode ray tube display 42 allows the operator to observe the reconstructed image and other data from computer 36. The operator supplied commands and parameters are used by computer 36 to provide control signals and information to x-ray controller 28, gantry motor controller 30, DAS 32, and table motor controller 44.

As shown in FIGS. 3 and 4, detector array 18 includes a plurality of detector modules 46. Each detector module 46 is secured to a detector housing 48. Each module 46 includes a multidimensional scintillator array 50 and a high density semiconductor array (not visible). A post patient collimator (not shown) is positioned over and adjacent scintillator array 50 to collimate x-ray beams before such beams impinge upon scintillator array 50. Scintillator array 50 includes a plurality of scintillation elements arranged in an array, and the semiconductor array includes a plurality of photodiodes (not visible) arranged in an identical array. The photodiodes are deposited, or formed on a substrate 52, and scintillator array 50 is positioned over and secured to substrate 52.

Detector module 46 also includes a switch apparatus 54 electrically coupled to a decoder 56. Switch apparatus 54 is a multidimensional semiconductor switch array of similar size as the photodiode array. In one embodiment, switch apparatus 54 includes an array of field effect transistors (not shown) with each field effect transistor (FET) having an input, an output, and a control line (not shown). Switch apparatus 54 is coupled between the photodiode array and DAS 32. Particularly, each switch apparatus FET input is electrically connected to a photodiode array output and each switch apparatus FET output is electrically connected to DAS 32, for example, using flexible electrical cable 58.

Decoder 56 controls the operation of switch apparatus 54 to enable, disable, or combine the outputs of the photodiode array in accordance with a desired number of slices and slice resolutions for each slice. Decoder 56, in one embodiment, is a decoder chip or a FET controller as known in the art. Decoder 56 includes a plurality of output and control lines coupled to switch apparatus 54 and computer 36. Particularly, the decoder outputs are electrically connected to the switch apparatus control lines to enable switch apparatus 54 to transmit the proper data from the switch apparatus inputs to the switch apparatus outputs. The decoder control lines are electrically connected to the switch apparatus control lines and determine which of the decoder outputs will be enabled. Utilizing decoder 56, specific FETs within switch apparatus 54 are enabled, disabled, or combined so that specific outputs of the photodiode array are electrically connected to CT system DAS 32. In one embodiment defined as a 16 slice mode, decoder 56 enables switch apparatus 54 so that all rows of the photodiode array are electrically connected to DAS 32, resulting in 16 separate, simultaneous slices of data being sent to DAS 32. It will be understood that many other slice combinations are possible.

In one embodiment, detector 18 includes fifty-seven detector modules 46. The semiconductor array and scintillator array 50 each have an array size of 16×16. As a result, detector 18 has 16 rows and 912 columns (16×57 modules), which enables 16 simultaneous slices of data to be collected with each rotation of gantry 12. It will be understood, however, that the present invention is not limited to a specific array size, and that the array can be larger or smaller depending upon operator needs. Also, detector 18 can be operated in many different slice thickness and number modes, e.g., one, two, and four slice modes. For example, in one embodiment, the FETs are configured in the four slice mode, so that data is collected for four slices from one or more rows of the photodiode array. Depending upon the specific configuration of the FETs as defined by decoder control lines, various combinations of outputs of the photodiode array are enabled, disabled, or combined so that the slice thickness is, for example, 1.25 mm, 2.5 mm, 3.75 mm, or 5 mm. Additional exemplary embodiments include one having a single slice mode including one slice with slices ranging from 1.25 mm thick to 20 mm thick, and another having a two slice mode including two slices with slices ranging from 1.25 mm thick to 10 mm thick. It will be recognized that embodiments having additional modes other than those described are possible.

Figure 5:
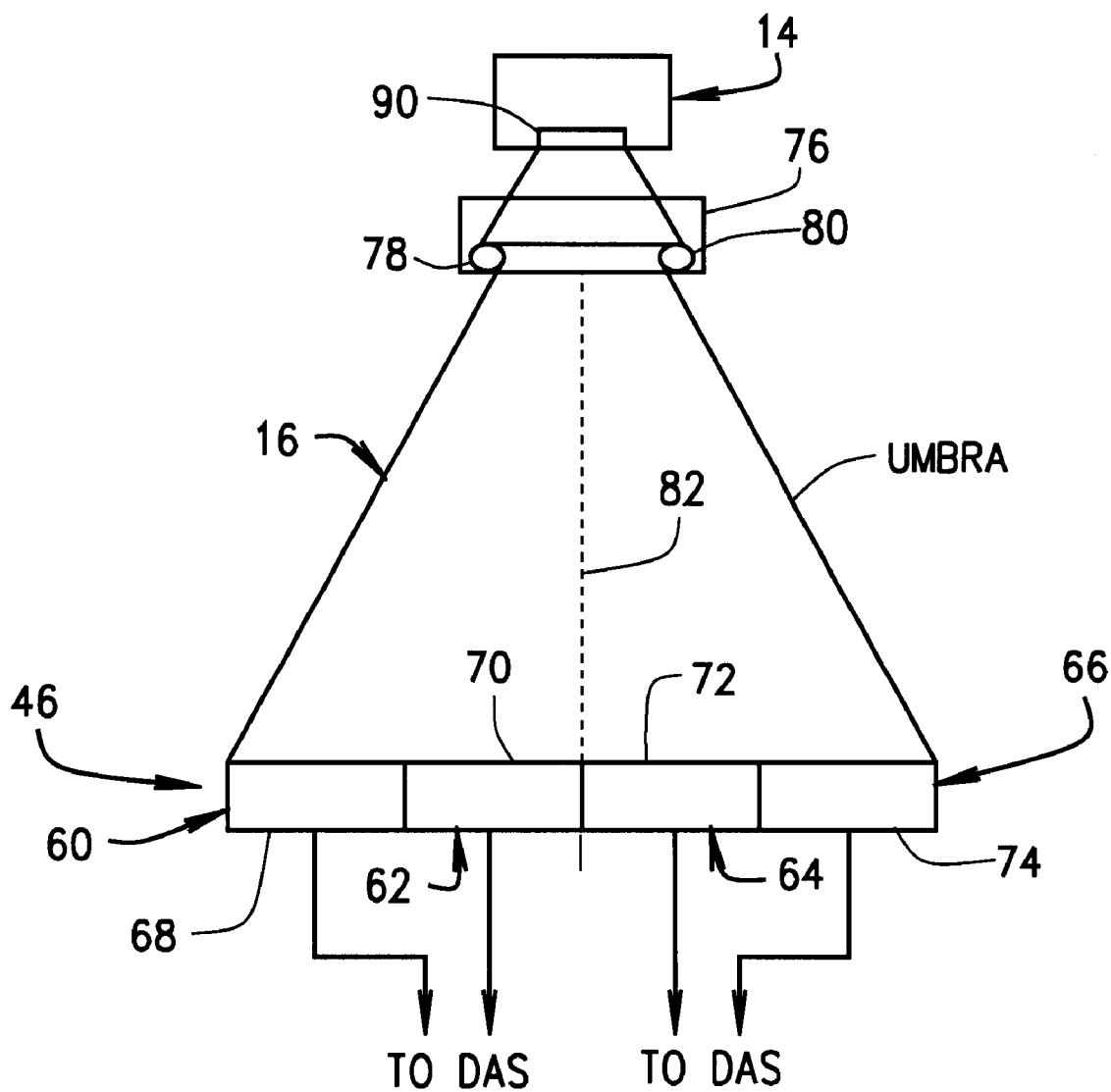
FIG. 5 is a schematic view of the CT imaging system shown in FIG. 1.

FIG. 5 is a simplified schematic view of an embodiment of a "four (or quad) slice" system in which four rows 60, 62, 64 and 66 of detector cells are utilized to obtain projection data. Detector cells 68, 70, 72, and 74 form rows 60, 62, 64, and 66. Each detector cell 68, 70, 72, and 74 illustrated in FIG. 5 is, in one embodiment, comprised of a number of cells (e.g., four) ganged together to produce one output which is supplied to DAS 32.

In one embodiment, collimator 76 includes eccentric cams 78 and 80. The position of cams 78 and 80 are controlled by x-ray controller 28. Cams 78 and 80 are positioned on opposing sides of fan beam plane 82 and are independently adjustable with respect to the spacing between cams 78 and 80 and their location relative to fan beam plane 82. For example, in one embodiment, cams 78 and 80 are positioned with a single cam drive, while in another, each cam is positioned with a separate cam drive, for example a motor. Cams 78 and 80 are fabricated from an x-ray absorbing material, for example, tungsten.

As a result of the eccentric shape, the rotation of respective cams 78 and 80 alters the z-axis profile of x-ray beam 16. More specifically, altering position of cams 78 and 80 alters the position and width of x-ray beam umbra. Particularly, as a result of the jointly stepping eccentric shape of cams 78 and 80, the total width of x-ray beam umbra is altered. Altering the position, or stepping, cam 78, alone, alters the umbra width and position relative to one edge of detector array 18. Altering the position of cam 80, alone, alters the umbra width and position relative to the other, or second edge, of detector array 18 so that the x-ray dosage received by patient 22 is reduced.

In operation, x-ray source 14 is fixed, or placed in a stationary position, and respective cams 78 and 80 are placed in nominal positions so that an x-ray beam 16 is radiated through collimator 76 toward detector array 18. Projection data from the detector is reconstructed by computer 36 using a fan beam filtered backprojection algorithm. This algorithm uses a $1/R^2$ weighting factor where R is the distance from a point in the image to the x-ray source. When the magnification factor is large, this weighting factor increases noise variation in the image. More particularly, the noise is increased away from the center of the image. The magnification factor is defined as a ratio of a distance from x-ray source 14 to detector 18, over a distance of x-ray source 14 to the isocenter.

Also, a multislice scanner typically has a shorter geometry which increases image noise away from the center of the image compared to other known longer geometry scanners. More particularly, and as a result of the geometry change and the fan beam reconstruction in the multislice system, to reduce the concentric force on the x-ray tube, the x-ray tube to iso-center distance needs to be reduced. Consequently, the magnification factor for such scanner increases, the scaling factor used in the fan beam backprojection increases, and the noise in the reconstructed image also increases.

The noise behavior is location dependent, and therefore, channel dependent, and DAS gain dependent. Because of the $$\frac{1}{R^2}$$

weighting factor for fan beam reconstruction, the noise is roughly the same at the iso-center and increases as a function of distance to the iso-center. The noise in the reconstructed image is the roughly weighted root mean square (RMS) average of the channel. Therefore, a smoothing function that increases noise suppression away from the isochannel will produce an increase in noise suppression. In general, a smoothing function applied to projection data will lead to a reduction in spatial resolution. Therefore, it is desirable to reduce image noise in a manner that has a minimal impact on resolution. Because at isocenter, noise performance of a CT system using a larger magnification factor is identical to that using a smaller magnification factor, no additional smoothing is required at the isochannel. As a result, there will be no impact on spatial resolution near the isochannel of a reconstructed image. Reduction in resolution will gradually increase with increased noise suppression. In general, filter functions $f(\gamma,k,g)$ used for noise suppression are functions of channel ($\gamma$), DAS gain (g), and detector row number (k). To further reduce an impact on computation time and to maximize reconstruction speed, filter kernel $f(\gamma,k,g)$ is incorporated into existing filter functions, for example, matrix deconvolution for off-focal radiation correction.

In one embodiment of the invention, the smoothing filter is expressed as:

$$H(\gamma,k)=f(\gamma,k,g)\oplus D(\gamma,k) \quad (1)$$

where H is the resulting composite filter that replaces the matrix deconvolution kernel, D, and f is the channel and DAS gain dependent smoothing filter convolved with the matrix deconvolution kernel D to produce the new kernel H. Also, $\gamma$ is the channel, g is the gain, and k represents the detector row number. In one embodiment, the filter is defined by a sequence of values (d, 1−2d, d), where:

$$d=m(1-\sin(\gamma)/\gamma) \quad (2)$$

and m is a scaling parameter to control a maximum amount of smoothing.

The above described filter is channel and DAS gain dependent. In addition, such filter can also be dependent on many other factors that affect the system noise, such as the reconstruction algorithms (e.g., the filter may differ for axial versus helical scans, and the filter may differ for high resolution versus low resolution mode).

In another embodiment of the present invention, a channel dependent, z-smoothing filter compensates for increased noise at a distance from an isochannel, which is a detector channel that detects a ray passing through a scanner isocenter. Again, impact of the correction on spatial resolution is minimized. The filter is executed in accordance with:

$$P'(\gamma,\beta,k)=s(\gamma,\beta,k,g)\oplus P(\gamma,\beta,k), \quad (3)$$

where:

P and P' are an original and a processed projection, respectively;

s is a channel ($\gamma$) and gain (g) dependent z-smoothing filter;

$\beta$ is a source projection angle; and k is a detector row number.

In one embodiment, noise in a field of view of the imaging device is measured prior to determining smoothing characteristics of z-smoothing filter s. The measured noise across at least a portion of the field of view, is reduced by selection of the smoothing characteristics of filter s, which necessarily produces some loss of resolution. However, in an embodiment in which smoothing is greatest at the edges of a field of view, loss of z resolution at the edges is compensated by utilizing the fact that any reconstructed point inside the field of view (FOV) are sampled by channels near the isocenter as well as by channels away from the isocenter. Parameters of filter s that compensate for measured noise are, in general, DAS gain dependent, but are not necessarily linearly related to DAS gain, and thus, may require calculation or adjustment for different values of DAS gain.

In an embodiment in which degradation of resolution is of concern, a z-smoothing filter is selected that only partially equalizes an amount of noise across a field of view to reduce degradation in z-resolution. To effect a further noise reduction, additional smoothing is applied in an x-y plane perpendicular to the z- or scanning axis, as described by equation (1), for example. The combination of smoothing techniques results in substantial noise reduction with reduced degradation of z-resolution.

In another embodiment, a z-smoothing filter that is also view ($\beta$) dependent is utilized. For example, a z-smoothing filter is selected in accordance with a priori knowledge of a patient to compensate for a known patient asymmetry that is dependent upon view. A variety of user-selectable, precomputed, $\beta$-dependent z-smoothing filters are provided, one of which is selected based upon an observed patient asymmetry, such as an unusually heavy bone structure that would increase noise in some views. By selection of an appropriate smoothing filter, at least partial compensation for noise effects resulting from the asymmetry can be achieved.

In another embodiment, a detector afterglow filter is provided with channel dependent parameters to effect a reduction in noise. A known impulse response of scintillation detectors is modeled in accordance with the equation:

$$h(t) = \sum_{n=1}^{N} \frac{\alpha_n}{\tau_n} e^{-1/\tau_n}, \quad (4)$$

where n designates one of N components of an exponential response which has relative strength $\alpha_n$ and a time constant $\tau_n$. Nominal values of $\alpha_n$ and $\tau_n$ are determined by measurement for a sufficient number of components, for example, (N=4), to accurately model scintillation detector behavior. In one embodiment of the invention, values of these parameters that vary from nominal and that are a function of channel position are used to effect a noise reduction.

More specifically, object or patient 22 is scanned by beam of radiation 16. A first set of radiation attenuation values is acquired by periodically sampling, at an interval $\Delta t$, a signal produced by radiation detector 18, where $y(k\Delta t)$ designates a value in the first set acquired during the kth sampling interval. Radiation detector 18 has an impulse response that varies exponentially. A channel dependent primary speed/afterglow correction is applied by producing a second set of data values from the first set of radiation attenuation values, in which each data value $x_k$ is defined by the equation:

$$x_k = \frac{y(k\Delta t) - \sum_{n=1}^{N} (\beta_n e^{-\Delta t/\tau_n}) S_{nk}}{\sum_{n=1}^{N} \beta_n} \quad (5)$$

where $\beta_n = \alpha_n(1 - e^{\Delta t/\tau_n})$; $\alpha_n$ represents a relative strength of an nth component of the impulse response which has time constant $\tau_n$, $\alpha_n$ varies as a function of channel position $\gamma$ and view angle $\beta$ and DAS gain K. For simplicity, the notation $\alpha_n$ is used instead of $\alpha_n(\gamma,\beta,k)$. The $\tau_n$ time constants vary as a function of channel position, DAS gain K and view angle $\beta$; and $S_{nk} = x_{k-1} + e^{-\Delta t/\tau_n} S_{n(k-1)}$, with $S_{nk} = 0$ for initial samples. The variation of time constants $\tau_n$ from their nominal values is selected to produce smoothing effects that result in a desired or predetermined noise reduction. An image of the object is reconstructed from the second set of data values.

In another embodiment, nominal time constants $\tau_n$ are used, and relative component strengths $\alpha_n$ are varied from their nominal values as a function of channel position, view angle and DAS gain to produce the desired or predetermined noise reduction. In yet another embodiment, both time constants $\tau_n$ and the relative component strengths $\alpha_n$ are varied as a function of channel position, view angle and DAS gain to produce the desired or predetermined noise reduction.

In an embodiment in which relative component strengths $\alpha_n$ are varied as a function of position, increasing a primary speed component $\alpha_1$ has an effect of reducing an amount of afterglow correction. This correction reduction produces a low pass filter effect on attenuation data which trades off azimuthal resolution for noise reduction. Therefore, to compensate for noise at an increasing distance from the isocenter, an amount of correction is reduced by gradually increasing primary speed component $\alpha_1$, for example, from 0.93 at the isocenter to 0.98 at an edge of the field of view, while correspondingly gradually decreasing $\alpha_2$, for example, from about 0.06 or 0.07 to about 0.02. The remaining afterglow correction terms are also correspondingly reduced, as necessary. A similar effect is produced in another embodiment by gradually varying $\tau_n$ values as a function of distance from isocenter rather than $\alpha_n$ values. The primary speed time constant $\tau_1$, for example, is gradually varied from 1.0 ms at isocenter to 0.9 ms at an edge of the field of view, and the first afterglow time constant $\tau_2$ is gradually varied from 4.0 ms at isocenter to 3.6 ms at the edge of the field of view. Longer afterglow time constants are also reduced at the edge of the field of view, as required. The afterglow time constants are not necessarily varied proportionately to one another or to the primary speed time constant. It will be understood that the numerical variations in $\alpha_n$ and $\tau_n$ described herein are exemplary in nature, and would be chosen in any particular embodiment in accordance with noise and resolution characteristics of the scanner, the type of scintillation material in use, and the desired trade-off between azimuthal resolution and image noise.

Each of the filters described above can be implemented in DAS 32, image reconstructor 34, or computer 36 of CT scanner 10, or in a separate computer. Although each of the filters described above are configured to reduce or to equalize noise in the image, it will be apparent to those skilled in the art that such filters could also be used to enhance radial spatial resolution as a function of distance from the center of the image. This is desirable in certain clinical applications (such as high resolution lung scanning) where high spatial resolution is required to a radius of 17 cm in the image. Without such a filter, the width of the x-ray tube focal distribution function degrades spatial resolution with distance from the center of the image. In one embodiment, a spatial resolution enhancing filter can be achieved by defining m in equation (2) with a negative magnification factor such as m=−25. It will be apparent to those skilled in the art that many other channel dependent filter definitions are possible. In addition, the concept is not limited to third generation CT systems. It could be used, for example, in a fourth generation CT system.

From the preceding description of various embodiments of the present invention, it is evident that noise compensation can be achieved. Although the invention has been described and illustrated in detail, it is to be clearly understood that the same is intended by way of illustration and example only and is not to be taken by way of limitation. For example, various hybrid embodiments comprising combinations of the noise compensation techniques described herein will become apparent to those skilled in the art. Such hybrid embodiments are useful in minimizing significant impact on system resolution in the x, y, or z direction, or along a specified direction or direction. Accordingly, the spirit and scope of the invention are to be limited only by the terms of the appended claims and equivalents thereof.

What is claimed is:

1. A method for image reconstruction in an imaging system having an x-ray source, an x-ray detector module having a plurality of detector elements having different positions and arranged in a plurality of rows, each detector element having a corresponding detector channel, a scanning axis z, and a data acquisition system (DAS) coupled to the detector module and providing detection gain, said method comprising the steps of:
   performing a scan to obtain data; and
   applying a z-smoothing filter to the data, wherein the smoothing applied to the data varies as a function of at least one member of the group consisting of channel position, x-ray projection angle, DAS gain, and detector row number.

2. A method in accordance with claim 1 wherein the plurality of channels includes an isochannel, and applying a z-smoothing filter to the data comprises applying an increased amount of smoothing to the data as a distance from an isochannel increases.

3. A method in accordance with claim 1 wherein applying a z-smoothing filter to the data is executed in accordance with:

$$P'(\gamma,\beta,k) = s(\gamma,\beta,k,g) \oplus P(\gamma,\beta,k),$$

where
   P and P' are an original and a processed projection, respectively;
   s is a smoothing filter;
   γ is a channel;
   g is a DAS gain;
   β is a source projection angle; and
   k is a detector row number.

4. A method in accordance with claim 3 wherein said step of applying a z-smoothing filter to the data comprises applying a z-smoothing filter that is also view (β) dependent.

5. A method in accordance with claim 4 wherein applying a z-smoothing filter that is also view dependent comprises a step of selecting a smoothing filter in accordance with a priori knowledge of a patient.

6. A method in accordance with claim 5 wherein selecting a z-smoothing filter in accordance with a priori knowledge of a patient comprises selecting one of a plurality of z-smoothing filters in accordance with a patient asymmetry.

7. A method in accordance with claim 1 and further comprising measuring an amount of position dependent noise in a field of view, and selecting the z-smoothing filter to reduce noise in at least a portion of the field of view.

8. A method in accordance with claim 7 wherein selecting the z-smoothing filter comprises selecting a z-smoothing filter to reduce noise through at least a portion of the field of view, said method further comprising the step of applying additional smoothing to the data in a plane perpendicular to the scanning axis z to further reduce noise.

9. A method for image reconstruction in an imaging system having an x-ray source and a detector module including a scintillator and a plurality of detector channels, said method comprising:
  performing a scan to obtain data; and
  applying a channel dependent primary speed/afterglow correction to the data thereby obtained to effect a predetermined, position dependent noise characteristic, an amount of the correction decreasing with increasing channel distance from an isocenter of the imaging system.

10. A method in accordance with claim 9 wherein the primary speed/afterglow correction is also dependent upon data acquisition system (DAS) gain.

11. A method in accordance with claim 9 wherein applying a channel dependent primary speed/afterglow correction comprises selecting channel dependent primary speed and afterglow strengths and time constants to effect a predetermined position-dependent noise characteristic.

12. A method in accordance with claim 11 wherein performing a scan to obtain data comprises:
  exposing an object to a beam of radiation; and
  acquiring a first set of radiation attenuation values by periodically sampling at an interval $\Delta t$ a signal produced by a radiation detector, where $y(k\Delta t)$ designates a value in the first set acquired during the kth sampling interval, the radiation detector having an impulse response that varies exponentially;
  and further wherein applying a channel dependent primary speed/afterglow correction comprises:
    producing a second set of data values from the first set of radiation attenuation values, in which each data value $x_k$ is defined by the equation:

$$x_k = \frac{y(k\Delta t) - \sum_{n=1}^{N} (\beta_n e^{-\Delta t/\tau_n}) S_{nk}}{\sum_{n=1}^{N} \beta_n}$$

where $\beta_n = \alpha_n(1 - e^{\Delta t/\tau_n})$;
  $\alpha_n$ represents a relative strength of an nth component of the impulse response which has time constant $\tau_n$, $\alpha_n$ varies as a function of at least one member of the group consisting of channel position, projection view, and DAS gain;
  the $\tau_n$ time constants vary as a function of at least one member of the group consisting of channel position, projection view, and DAS gain; and
  $S_{nk} = x_{k-1} + e^{-\Delta t/\tau_n} S_{n(k-1)}$, with $S_{nk} = 0$ for initial samples;
  and further comprising reconstructing an image of the object from the second set of data values.

13. A method in accordance with claim 9 wherein applying a channel dependent primary speed/afterglow correction comprises selecting relative channel dependent primary speed and afterglow strengths to effect a predetermined position-dependent noise characteristic.

14. A method in accordance with claim 13 wherein performing a scan to obtain data comprises:
  exposing an object to a beam of radiation; and
  acquiring a first set of radiation attenuation values by periodically sampling at an interval $\Delta t$ a signal produced by a radiation detector, where $y(k\Delta t)$ designates a value in the first set acquired during the kth sampling interval, the radiation detector having an impulse response that varies exponentially;
  and further wherein applying a channel dependent primary speed/afterglow correction comprises:
    producing a second set of data values from the first set of radiation attenuation values, in which each data value $x_k$ is defined by the equation:

$$x_k = \frac{y(k\Delta t) - \sum_{n=1}^{N} (\beta_n e^{-\Delta t/\tau_n}) S_{nk}}{\sum_{n=1}^{N} \beta_n}$$

where $\beta_n = \alpha_n(1 - e^{\Delta t/\tau_n})$;
  $\alpha_n$ represents a relative strength of an nth component of the impulse response which has time constant $\tau_n$, $\alpha_n$ varies as a function of at least one member of the group consisting of channel position, projection view, and DAS gain;
  the $\tau_n$ time constants vary as a function of at least one member of the group consisting of channel position, projection view, and DAS gain; and
  $S_{nk} = x_{k-1} + e^{-\Delta t/\tau_n} S_{n(k-1)}$, with $S_{nk} = 0$ for initial samples;
  and further comprising reconstructing an image of the object from the second set of data values.

15. A method in accordance with claim 14 wherein the $\tau_n$ time constants also vary as a function of channel position.

16. An imaging system comprising an x-ray source, at least one x-ray detector module having a plurality of elements each having different positions and arranged in a plurality of rows, each detector element having a corresponding detector channel, said system having a scanning axis z and further comprising a data acquisition system (DAS) coupled to said detector module and providing detector gain, said system configured to:
  perform a scan to obtain data; and
  apply a z-smoothing filter to the data, wherein the smoothing applied to the data varies as a function of at least one member of the group consisting of channel position, x-ray projection angle, DAS gain, and detector row number.

17. A system in accordance with claim 16 wherein the plurality of channels comprises an isochannel, and said system is configured to perform an increased amount of z-smoothing of the data, as a distance from an isochannel increases.

18. A system in accordance with claim 1 configured to apply z-smoothing of the data in accordance with:

$$P'(\gamma,\beta,k) = s(\gamma,\beta,k,g) \oplus (\gamma,\beta,k),$$

where P and P' are an original and a processed projection, respectively;
   s is a smoothing filter;
   γ is a channel;
   g is a DAS gain;
   β is a source projection angle; and
   k is a detector row number.

19. A system in accordance with claim 18 wherein said z-smoothing filter is also view (β) dependent.

20. A system in accordance with claim 19 configured to provide a selection of one of a plurality of z-smoothing filters.

21. A system in accordance with claim 15 in which parameters of the z-smoothing filter are selected to reduce noise in at least a portion of the field of view.

22. A system in accordance with claim 21 configured to provide additional smoothing to the data in a plane perpendicular to the scanning axis z to further reduce noise.

23. An imaging system comprising an x-ray source and at least one radiation detector module including a scintillator and a data acquisition system coupled to said scintillator, said imaging system having an isocenter and configured to:
   perform a scan to obtain data; and
   apply a channel dependent primary speed/afterglow correction to the data thereby obtained, an amount of the correction decreasing with increasing channel distance from the isocenter of the imaging system.

24. A system in accordance with claim 23 configured to apply a primary speed/afterglow correction that is also dependent upon data acquisition system (DAS) gain.

25. A system in accordance with claim 23 wherein to apply a channel dependent primary speed/afterglow correction, said system is configured to apply channel dependent primary speed and afterglow time constants selected to produce a predetermined position-dependent noise characteristic.

26. A system in accordance with claim 25 configured to:
   expose an object to a beam of radiation; and
   acquire a first set of radiation attenuation values by periodically sampling at an interval Δt a signal produced by said radiation detector, where y(kΔt) designates a value in the first set acquired during the kth sampling interval, said radiation detector having an impulse response that varies exponentially;
   and wherein to apply a channel dependent primary speed/afterglow correction, said system is configured to:
      produce a second set of data values from the first set of radiation attenuation values, in which each data value $x_k$ is defined by the equation:

$$x_k = \frac{y(k\Delta t) - \sum_{n=1}^{N}(\beta_n e^{-\Delta t/\tau_n})S_{nk}}{\sum_{n=1}^{N}\beta_n}$$

where $\beta_n = \alpha_n(1-e^{\Delta t/\tau_n})$;
   $\alpha_n$ represents a relative strength of an nth component of the impulse response which has time constant $\tau_n$, $\alpha_n$ varies as a function of at least one member of the group consisting of channel position, projection view, and DAS gain;
   the $\tau_n$ time constants vary as a function of at least one member of the group consisting of channel position, projection view, and DAS gain; and
   $S_{nk} = x_{k-1} + e^{-\Delta t/\tau_n}S_{n(k-1)}$, with $S_{nk}=0$ for initial samples;
   and to reconstruct an image of the object from the second set of data values.

27. A system in accordance with claim 23 wherein to apply a channel dependent primary speed/afterglow correction, said system is configured to apply relative channel dependent primary speed and afterglow strengths selected to produce a predetermined position-dependent noise characteristic.

28. A system in accordance with claim 27 wherein to perform a scan to obtain data, said system is configured to:
   expose an object to a beam of radiation; and
   acquire a first set of radiation attenuation values by periodically sampling at an interval Δt a signal produced by said radiation detector, where y(kΔt) designates a value in the first set acquired during the kth sampling interval, said radiation detector having an impulse response that varies exponentially;
   and further wherein to apply a channel dependent primary speed/afterglow correction, said system is configured to:
      produce a second set of data values from the first set of radiation attenuation values, in which each data value $x_k$ is defined by the equation:

$$x_k = \frac{y(k\Delta t) - \sum_{n=1}^{N}(\beta_n e^{-\Delta t/\tau_n})S_{nk}}{\sum_{n=1}^{N}\beta_n}$$

where $\beta_n = \alpha_n(1-e^{\Delta t/\tau_n})$;
   $\alpha_n$ represents a relative strength of an nth component of the impulse response which has time constant $\tau_n$, $\alpha_n$ varies as a function of at least one member of the group consisting of channel position, projection view, and DAS gain;
   the $\tau_n$ time constants vary as a function of at least one member of the group consisting of channel position, projection view, and DAS gain; and
   $S_{nk} = x_{k-1} + e^{-\Delta t/\tau_n}S_{n(k-1)}$, with $S_{nk}=0$ for initial samples;
   said system further configured to reconstruct an image of the object from the second set of data values.

29. A system in accordance with claim 28 wherein the $\tau_n$ time constants also vary as a function of channel position.

* * * * *

UNITED STATES PATENT AND TRADEMARK OFFICE
CERTIFICATE OF CORRECTION

PATENT NO. : 6,295,331 B1
DATED : September 25, 2001
INVENTOR(S) : Jiang Hsieh

It is certified that error appears in the above-identified patent and that said Letters Patent is hereby corrected as shown below:

<u>Column 5,</u>
Lines 42 and 68, delete "⊕" and insert therefor -- ⊗ --.

<u>Column 8,</u>
Line 28, delete "or direction" and insert therefor -- or directions --.
Line 55, delete "⊕" and insert therefor -- ⊗ --.

<u>Column 10,</u>
Line 68, delete "⊕" and insert therefor -- ⊗ P --.

<u>Column 12,</u>
Line 43, after "$\tau_n$" insert -- ) --.

Signed and Sealed this

Eighteenth Day of March, 2003

JAMES E. ROGAN
*Director of the United States Patent and Trademark Office*